United States Patent [19]

Osendorf

[11] Patent Number: 5,306,321
[45] Date of Patent: Apr. 26, 1994

[54] LAYERED AIR FILTER MEDIUM HAVING IMPROVED EFFICIENCY AND PLEATABILITY

[75] Inventor: Richard J. Osendorf, North St. Paul, Minn.

[73] Assignee: Donaldson Company, Inc., Minneapolis, Minn.

[21] Appl. No.: 112,640

[22] Filed: Aug. 25, 1993

Related U.S. Application Data

[63] Continuation of Ser. No. 909,791, Jul. 7, 1992, abandoned.

[51] Int. Cl.⁵ .................. B01D 39/16; B01D 46/02
[52] U.S. Cl. .......................... 55/487; 55/498; 55/521; 55/524; 55/528; 210/493.1; 210/493.2
[58] Field of Search ............. 55/486, 487, 498, 502, 55/521, 524, 528; 210/493.1, 493.2, 493.3, 493.4, 493.5

[56] References Cited

U.S. PATENT DOCUMENTS

| | | | |
|---|---|---|---|
| 1,411,975 | 3/1920 | Matson | 55/486 |
| 2,724,457 | 11/1955 | Besser | 55/103 |
| 3,361,260 | 1/1968 | Buckman | 210/493.1 |
| 3,763,633 | 10/1973 | Soltis | 55/126 |
| 3,925,043 | 12/1975 | Matrone et al. | 55/276 |
| 4,268,290 | 5/1981 | Barrington | 55/521 |
| 4,323,374 | 4/1982 | Shinagawa et al. | 55/132 |
| 4,650,506 | 3/1987 | Barris et al. | 55/487 |
| 4,702,940 | 10/1987 | Nakayama et al. | 55/487 |
| 4,714,647 | 12/1987 | Shipp et al. | 55/487 |
| 4,728,349 | 3/1988 | Oshitari | 55/487 |
| 4,824,451 | 4/1989 | Vogt et al. | 55/528 |
| 4,877,433 | 10/1989 | Oshitari | 55/486 |
| 4,880,448 | 11/1989 | Scherrer | 55/103 |
| 4,886,527 | 12/1989 | Föttinger et al. | 55/156 |
| 4,917,714 | 4/1990 | Kinsley, Jr. | 55/524 |
| 4,917,942 | 4/1990 | Winters | 428/286 |
| 4,976,858 | 12/1990 | Kadoya | 210/496 |
| 5,037,455 | 8/1991 | Scheineson et al. | 55/103 |
| 5,071,555 | 12/1991 | Enbom | 210/493.5 |

OTHER PUBLICATIONS

Brochure, Donaldson Company, *Ultra-Web®  High Performance Air Filtration*, (1989).
Brochure, Donaldson Company, Inc., *Torit-Built ™ Filters* (1990).

*Primary Examiner*—Charles Hart
*Attorney, Agent, or Firm*—Merchant, Gould, Smith, Edell, Welter & Schmidt

[57] ABSTRACT

The present invention is directed at a filter and method for making the filter. The filter has a first filter layer of high efficiency melt blown filter medium having an efficiency of pre-HEPA to HEPA, and a second filter layer of cellulose support medium by which the first filter layer is supported. The filter is pleated, and a plurality of dimples for separating a plurality of pleats can be fabricated on the pleat tips.

13 Claims, 2 Drawing Sheets

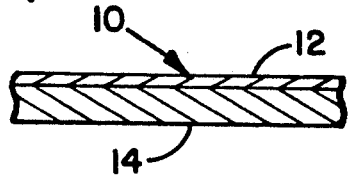
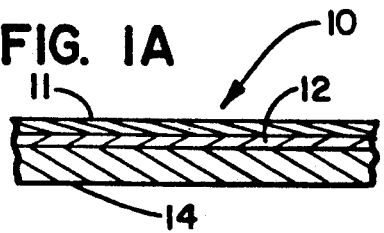
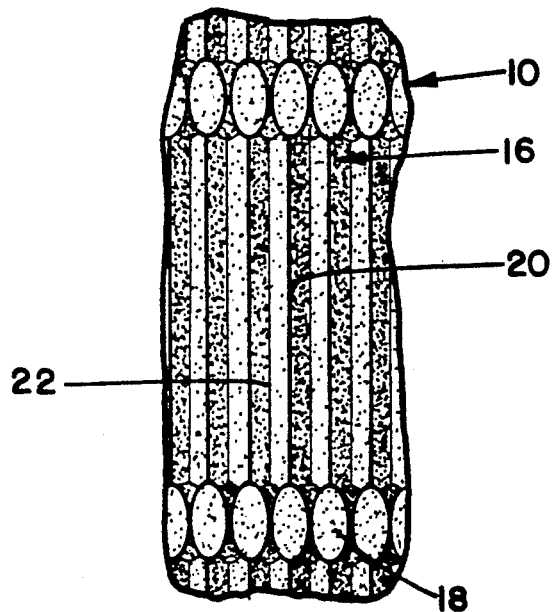
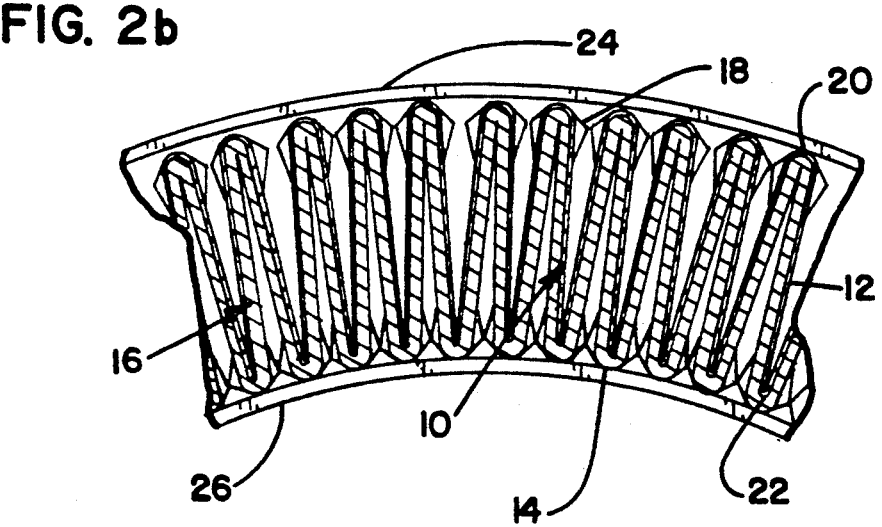

LAYERED AIR FILTER MEDIUM HAVING IMPROVED EFFICIENCY AND PLEATABILITY

This is a continuation of application Ser. No. 07/909,791, filed Jul. 7, 1992 and now abandoned.

TECHNICAL FIELD

The present invention pertains generally to the field of fiber-type media for the filtration of fluids, and filters incorporating the fiber-type media.

BACKGROUND OF THE INVENTION

As a part of an effort to make aircraft, trucks, automobiles, and other filtration application more energy efficient, producers of air filters have searched for ways to produce more efficient and lighter filters for use in vehicles. In the past, higher "Figure of Merit", that is lower pressure drop through a filter, and a higher particulate removal rate have come at the expense of increasing the weight of the filter.

For example, pleated cylindrical glass-fiber air filters have been developed with high removal rates and low pressure drops through the filter. Pleating the fiberglass filter medium makes it possible to expose a greater filter media surface area to an incident flow of fluid in a more compact space than with flat, unpleated filter media. Each pleat has a tip or first-fold facing the incident flow, and a first side and a second side extending downstream from the tip creating a wedge shape pleat. Downstream, the first side of each pleat meets the second side of each adjacent pleat at a second fold. The pleating gives the filter medium an accordion-like appearance.

Pleated filters, however, are subject to two modes of failure, ballooning and bunching. Ballooning occurs when pressure created by the incident fluid flow on the upstream side of the filter pushes the first side of the pleat into contact with the second side of the same pleat, collapsing the pleat's wedge shape. This greatly reduces the performance of the filter by effectively reducing the area available for the fluid flow to exit the filter medium. Bunching is a related problem which also reduces the performance of the filter by effectively reducing its surface area. Bunching occurs when the pressure of the fluid flow squeezes together several of the pleats and unfolds or flattens others.

To prevent ballooning and bunching, several pleat supporting devices have been developed. These include corrugated aluminum separators, hot melt beads, and Pleatloc TM dimples. Generally, the corrugated aluminum separators are placed between the first and second sides of the pleats, both on the upstream and downstream sides of the filter medium. Corrugations in the corrugated aluminum separators are oriented parallel to the incoming flow to provide small channel-like passages for the fluid flow to pass through. Unfortunately, glass filters manufactured with corrugated aluminum spacers are heavy and relatively expensive to manufacture.

Hot melt beads are an alternative to corrugated aluminum separators. Hot melt beads are essentially small plastic welds between the first and second sides of the pleats. For each pleat, a plurality of hot melt beads may be periodically spaced along the length of the pleat. Although hot melt beads may provide support to the pleats with less additional weight than corrugated aluminum separators, hot melt beads are still relatively heavy and expensive. Additionally, unlike the corrugated aluminum separators, hot melt beads may be flammable and toxic and, thus, cannot be safely used in aircraft and other applications, such as heating ventilation and air conditioning.

The development of Pleatloc TM dimples, disclosed in U.S. Pat. No. 4,452,619, was a significant advancement over the corrugated aluminum separators and the hot melt beads. Pleatloc TM dimples are formed in the filter medium itself by flattening the tip of each pleat. For each pleat, a plurality of dimples may be periodically spaced along the length of the pleat. This flattening creates a dimple which extends perpendicularly beyond the sides of the pleat. When the tips of each adjacent pleat are likewise flattened, the dimples provide separation of the adjacent pleats. The second fold, or downstream fold of the pleat, can also have dimples. Fabricating the dimples is relatively inexpensive compared to corrugated aluminum separators and hot melt beads. Because no additional materials are used, the weight of the filter is not increased by use of dimples to space the pleats.

Although dimples are an inexpensive, light, and safe way to prevent pleat bunching or ballooning, they are difficult if not impossible, to effectively fabricate on glass fiber pleats. Pleat-tip fracture is likely when flattening the relatively brittle glass fiber pleats to form the dimples. Pleat-tip fracture is a break in the continuity of the pleat at its tip. With numerous breaks in the glass fiber filter medium, a significant amount of fluid may pass through the tip fractures without being filtered, thus greatly reducing the particle removal efficiency of the filter.

Pleatloc TM dimples have been used effectively with less brittle filter media, such as Donaldson Company, Inc.'s Ultra-Web® filter media. The Ultra-Web® filter media is produced by depositing a layer of fine fibers on a cellulose medium. The cellulose alone provides little sub-micron filtration, but is used primarily as a support medium for the deposition of the fine fibers. The particle removal efficiency of the Ultra-Web® filter media can be enhanced by the deposition of additional fine fibers on the cellulose support medium. With the deposition of fine fibers, however, care must be taken during the manufacturing process not to damage the delicate fiber layer.

The need for efficiency is almost nowhere else as great as in the aircraft industry given inherent limitations on space and weight. Flammability is also a concern in the aircraft industry. Relatively expensive and heavy pleated cylindrical fiberglass filters are currently used in aircraft to filter air for the passengers therein because they are very efficient and are constructed from non-flammable materials. These filters have relied on the heavy corrugated aluminum separators to provide pleat separation.

SUMMARY OF THE INVENTION

I have discovered that the foregoing problems regarding the design of filters can be overcome by fabricating a layered air filter medium including a high efficiency layer of HEPA (greater than or equal to 99.97% efficiency on 0.3 micron particles) or pre-HEPA (less than 99.97% efficiency on 0.3 micron particles) melt blown filter medium layer (see U.S. Pat. No. 4,824,451) constructed as a separate layer and then laminated to the surface of a non-glass support medium. The non-glass support medium is preferably cellulose, but may be made of materials such as polyester or rayon. The non-glass support medium does little or no sub-micron filtering, but rather primarily supports the melt blown filter medium layer.

Although melt blown filter medium can achieve the same filtering efficiencies as fiberglass, the melt blown medium is too limp to be self supporting. In this respect, the melt blown filter medium is like a light cotton fabric. Thus, unlike fiberglass, melt blown is not pleatable. I have found, however, that when the melt blown is laminated to the surface of a more rigid non-glass support medium, the combined filter can be pleated like fiberglass. Unlike fiberglass, however, the combined filter is not brittle. This allows Pleatloc TM dimples to be substituted for the heavy corrugated aluminum separators or flammable hot melt beads normally used with high efficiency filters to prevent ballooning, bunching, and tip fracture.

With the filter medium of the present invention, a filter can now be constructed for the aircraft industry which is at least as efficient as the presently used glass-fiber filters, significantly lighter than the current filters using corrugated aluminum separators, and much less flammable as compared to those filters using hot melt beads as pleat separators.

These advantages and other objects obtained with the invention are further explained hereinafter with more particularity by reference to the preferred embodiment as shown in the following drawings.

BRIEF DESCRIPTION OF THE DRAWINGS

Referring now the drawings wherein in like reference numerals designate identical or corresponding parts throughout the several views:

FIGS. 1 and 1a are enlarged cross sections of a fragments of filters in accordance with the present invention;

FIG. 2a is a fragmentary view of the filter medium of the present invention pleated and dimpled;

FIG. 2b is a cross section of the pleated and dimpled filter medium within a portion of a cylindrical metal liner of a filter in accordance with the present invention.

DETAILED DESCRIPTION OF THE PREFERRED EMBODIMENT

Figure 2:
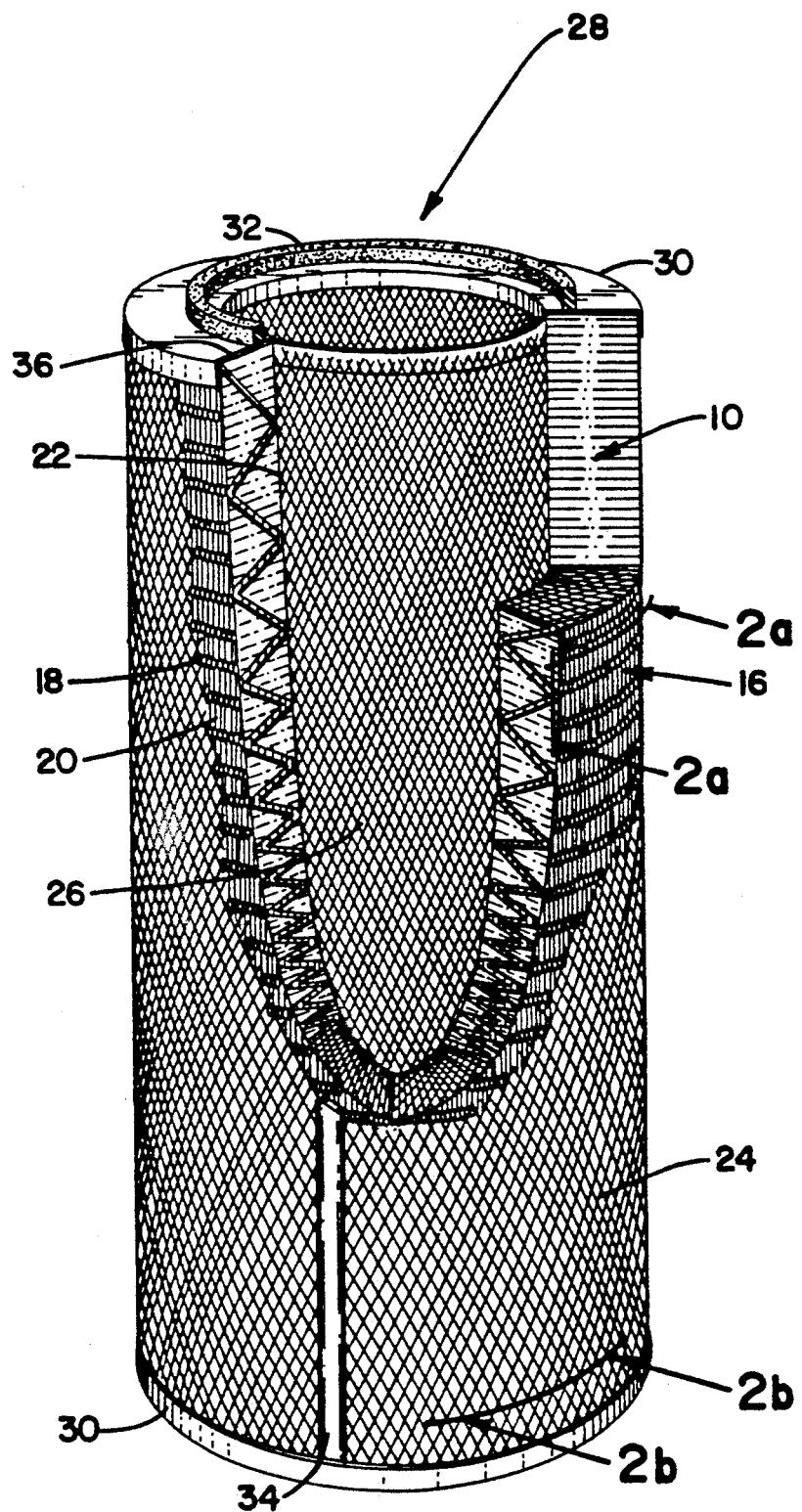
FIG. 2 is a view in perspective of a cylindrical, pleated filter in accordance with the present invention, portions thereof being broken away and portions shown in section.

FIG. 1 shows a cross section of the filter medium in accordance with the invention, generally designed as 10. The filter medium 10 has a first filter layer 12 of high efficiency filter medium, and a second filter layer of non-glass support medium 14.

The first filter layer 12 is melt blown filter medium as described in U.S. Pat. No. 4,824,451 to Vogt, et al. The melt blown filter medium is a web of polypropylene fibers. The web has fibers with an average diameter of about 5 microns and surface pores of less than 30 microns. The melt blown layer 12 has a texture and flexibility similar to a light cotton fabric.

The second filter layer 14 is preferably cellulose. The cellulose material unlike the melt blown layer 12 is relatively rigid, similar to a stiff paper or cardboard.

The melt blown layer 12 does the majority of the filtering done by the filter medium 10. The melt blown layer 12 has a high efficiency in the pre-HEPA to HEPA range. Filtering efficiency can be varied by changing the characteristics of the melt blown material, increasing the thickness of the melt blown layer, or adding additional layers of melt blown.

Second filter layer 14 primarily provides structural support for first filter layer 12, and provides only incidental filtering. The support provided by second layer 14 allows the filter medium to be pleated and dimpled with Pleatloc TM dimples.

First filter layer 12 can be laminated on second filter layer 14 by at least three different methods. The method that should be used depends upon the intended use of filter medium 10. When filter medium 10 is used in aircraft applications, relatively high velocity air flow through filter medium 10 is typical. In aircraft, air flow velocities through the filter of 30 feet per minute or more are not unusual. In such circumstances, it is preferable to laminate first filter layer 12 to the upstream side of second filter layer 14. This can be accomplished by spray bonding, ultrasonic bonding or hotmelt bonding. For some applications, first filter layer 12 can be laminated to the downstream side of second filter layer 14, preferably by spray bonding. Layer 14 would act as a pre-filter when layer 12 is downstream.

FIG. 1a shows a cross-section of an alternative embodiment of the filter medium in accordance with the present invention. The alternative embodiment has a scrim layer 11 for enhancing dust loading. Scrim layer 11 is preferably made of the same raw material as filter layer 12. If ultrasonic bonding is used to bond scrim layer 11 to filter layer 12, it is particularly desirable that the same material be used for both scrim layer 11 and filter 12 because the melting temperature of layers 11 and 12 are preferably the same. If spray bonding is used to join scrim layer 11 to filter layer 12, scrim layer 11 need not be made from the same material as filter layer 12. Scrim layer 11 preferably has a lower sub-micron filtering efficiency that filter layer 12.

FIG. 2a shows a partial view of a sheet of filter medium 10 which has been pleated and dimpled. A plurality of pleats are designated generally as 16. Each pleat 16 has an upstream fold or tip 20 and a downstream fold 22. Dimples 18 are shown pressed in both the tips 20 and downstream folds 22 of the pleats 16.

FIG. 2b shows a cross sectional view of pleated filter medium 10 shown in FIG. 2a. In FIG. 2b pleated filter medium 10 is shown within a portion of a cylindrical cartridge filter having an outer filter liner 24 and an inner filter liner 26. In this case first filter layer 12 is shown on the upstream side of filter medium 10. Separation of pleats 16 is provided by dimples 18 on both tips 20 and downstream folds 22 of pleats 16.

FIG. 2 shows a cutaway view of filter 28 in accordance with the present invention. Filter medium 10 having pleats 16 with dimples 18 on both tips 20 and downstream folds 22 is enclosed within outer filter liner 24 and inner filter liner 26. Outer filter liner 24 has a seam 34. On each end of the cylinder is an endcap 30. Within endcaps 30 is a potting material 36 which creates a seal between the ends of filter medium 10 and endcaps 30. A gasket 32 on endcap 30 can be used to create a seal between filter 28 and a receiving dust collector or ventilation system.

In use, filter 28 is installed in a dust collector or ventilation system. A fan or other device creates a fluid flow through filter medium 10. Particulate is removed from the fluid flow by collecting on first filter layer 12, and incidentally on second filter layer 14.

Although, characteristics and advantages, together with details of structure and function have been described in reference to the preferred embodiment herein, it is understood that the disclosure is illustrative. To that degree, various changes made specially in matters of shape, size, and arrangement to the full extent of the general meeting of the terms in which the appended claims are expressed, are within the principles of the present invention.

What is claimed is:

1. An air filter comprising:
   a first filter layer of melt blown filter medium having an efficiency of at least 99.97% on 0.3 micron particles;
   a second filter layer of support medium by which said first filter layer is supported; and
   means for laminating said layers together to form a filter; said filter being pleated into a plurality of pleats having tips and opposing folds, and a plurality of dimples formed on said tips and said folds for separating said pleats.

2. An air filter in accordance with claim 1, wherein said second filter layer is cellulose.

3. An air filter in accordance with claim 1, wherein said pleat has pleat tips and said dimples are formed on said tips.

4. An air filter cartridge comprising:
   a first filter layer of melt blown filter medium wherein the filter medium is a web of fibers with an average diameter of about 5 microns and surface pores of less than 30 microns having an efficiency of at least 99.97% on 0.3 micron particles;
   a second separately formed filter layer of support medium to which said first filter layer is affixed to form a filter said filter being pleated to form a plurality of pleats having dimples for separating said pleats;
   a generally cylindrical outer filter liner having opposite ends;
   a generally cylindrical inner filter liner having opposite ends; wherein said pleated and dimpled filter is held between said outer filter liner and said inner filter liner; and
   said inner liner and outer liner ends are covered by end caps.

5. An air filter cartridge in accordance with claim 4, wherein said second filter layer is cellulose.

6. A method of making a filter, comprising the steps of:
   affixing a first filter layer of melt blown filter medium having an efficiency of at least 99.97% on 0.3 micron particles to a second filter layer of support medium to form a filter;
   pleating said filter; and
   forming dimples into tips of said pleats for separating said pleats.

7. A method according to claim 6, comprising the additional step of bonding a scrim layer to the first layer.

8. A method according to claim 7, wherein the first layer has a higher sub-micron filtering efficiency than the scrim layer.

9. A method of making a filter in accordance with claim 6, wherein said second filter layer is cellulose.

10. A replaceable and disposable air filter cartridge having high efficiency and light weight comprising:
    a first filter layer of melt blown filter medium having an efficiency of at least 99.97% on 0.3 micron particles;
    a second separately formed filter layer of nonglass support medium to which said first layer is affixed to form a filter, said filter being pleated to form a plurality of pleats having dimples for separating said pleats;
    a generally cylindrical outer filter liner having opposite ends;
    a generally cylindrical inner filter liner having opposite ends, wherein said pleated and dimpled filter is held between said outer filter liner and said inner filter liner; and
    said inner layer and outer liner ends are covered by end caps.

11. An air filter according to claim 10, wherein the first filter layer comprises a web of fibers having an average diameter of about 5 microns and surface pores of less than 30 microns.

12. An air filter according to claim 11, further comprising a scrim layer bonded to said first layer.

13. An air filter according to claim 12, wherein said layer has a higher sub-micron filtering efficiency than said scrim layer.

* * * * *

UNITED STATES PATENT AND TRADEMARK OFFICE
CERTIFICATE OF CORRECTION

PATENT NO. :  5,306,321
DATED      :  April 26, 1994
INVENTOR(S) : Richard J. Osendorf It is certified that error appears in the above-identified patent and that said Letters Patent is hereby corrected as shown below:

Claim 10, line 36, "layer" should read --liner--.

Claim 13, line 44, insert the word --first-- after the word "said".

Signed and Sealed this

Thirteenth Day of September, 1994

Attest:

BRUCE LEHMAN

Attesting Officer

Commissioner of Patents and Trademarks